(12) United States Patent
Hanks

(10) Patent No.: US 9,480,936 B2
(45) Date of Patent: Nov. 1, 2016

(54) MULTISTAGE COMPOSITE FLUID SEPARATOR AND FILTER

(71) Applicant: Gary D. Hanks, Bowling Green, KY (US)

(72) Inventor: Gary D. Hanks, Bowling Green, KY (US)

(*) Notice: Subject to any disclaimer, the term of this patent is extended or adjusted under 35 U.S.C. 154(b) by 373 days.

(21) Appl. No.: 13/986,441

(22) Filed: May 2, 2013

(65) Prior Publication Data

US 2014/0069859 A1 Mar. 13, 2014

Related U.S. Application Data

(60) Provisional application No. 61/687,833, filed on May 2, 2012.

(51) Int. Cl.
*B01D 17/028* (2006.01)
*B01D 21/02* (2006.01)
*B01D 21/00* (2006.01)
*B01D 17/02* (2006.01)

(52) U.S. Cl.
CPC ....... *B01D 21/0042* (2013.01); *B01D 17/0211* (2013.01); *B01D 17/0214* (2013.01); *B01D 21/0012* (2013.01); *B01D 21/0048* (2013.01); *B01D 21/0066* (2013.01); *B01D 21/0069* (2013.01); *B01D 21/0009* (2013.01)

(58) Field of Classification Search
CPC .......... B01D 17/0211; B01D 17/0214; B01D 21/0012; B01D 21/0042; B01D 21/0048; B01D 21/0066; B01D 21/0069; B01D 36/04
USPC ............ 210/262, 305, 521, 522, 532.1, 538, 210/540, DIG. 5
See application file for complete search history.

(56) References Cited

U.S. PATENT DOCUMENTS

| | | | |
|---|---|---|---|
| 367,308 A * | 7/1887 | MacNab | 210/521 |
| 1,458,805 A | 6/1923 | Christensen | |
| 1,661,284 A | 3/1928 | Fugua et al. | |
| 1,677,324 A * | 7/1928 | Beck et al. | 210/305 |
| 1,940,794 A * | 12/1933 | Fisher | 210/522 |
| 2,846,073 A | 8/1958 | Hopper, Sr | |
| 3,331,510 A | 7/1967 | Arnold | |
| 3,754,656 A | 8/1973 | Horiguchi et al. | |
| 3,797,203 A | 3/1974 | Anderson et al. | |
| 3,849,311 A | 11/1974 | Jakubek | |
| 3,933,654 A | 1/1976 | Middelbeek | |
| 4,064,054 A | 12/1977 | Anderson et al. | |
| 4,122,016 A | 10/1978 | Tao et al. | |
| 4,203,849 A | 5/1980 | Ino et al. | |
| 4,299,699 A | 11/1981 | Boogay | |
| 4,376,676 A | 3/1983 | Gill | |

(Continued)

*Primary Examiner* — Christopher Upton
(74) *Attorney, Agent, or Firm* — Carrithers Law Office PLLC

(57) ABSTRACT

A multistage composite fluid separator capable of isolating a first liquid from a composite fluid having at least a first and second liquid, in which the first and second liquids have differing specific gravities or for separating solid contaminates from at least one liquid. An outer housing encloses a plurality of separation chambers. An inlet port delivers the composite fluid through an elongated spillway into the sump of the chambers. Positioned between the inlet and the outlet of each chamber is a plurality of stacked baffles, composed of individual separation flow plates, placed in an inclined relationship. The plurality of baffles creates a flow path in which the composite fluid is forced to flow over each of the individual separation flow plates as the fluid travels upward in the separation chamber toward the outlet port shearing the liquid causing coalescence and coagulation of liquids due to their density and/or viscosity.

6 Claims, 8 Drawing Sheets

(56) References Cited

U.S. PATENT DOCUMENTS

| | | |
|---|---|---|
| 4,400,274 A | 8/1983 | Protos |
| 4,411,791 A | 10/1983 | Ward |
| 4,568,901 A | 2/1986 | Adam |
| 4,747,948 A | 5/1988 | North |
| 5,161,512 A | 11/1992 | Adam et al. |
| 5,173,195 A | 12/1992 | Wright et al. |
| 5,252,229 A | 10/1993 | Rojey et al. |
| 5,314,617 A | 5/1994 | Karterman |
| 5,397,472 A | 3/1995 | Bouchard |
| 5,520,825 A | 5/1996 | Rice |
| 5,554,301 A | 9/1996 | Rippetoe et al. |
| 5,628,901 A | 5/1997 | Lawrence et al. |
| 5,685,974 A | 11/1997 | Fleming |
| 5,698,102 A | 12/1997 | Khudenko |
| 5,840,198 A | 11/1998 | Clarke |
| 6,042,722 A | 3/2000 | Lenz |
| 6,056,128 A | 5/2000 | Glasgow |
| 6,217,777 B1 | 4/2001 | Dahlquist et al. |
| 6,315,131 B1 | 11/2001 | Terrien et al. |
| 6,495,035 B2 | 12/2002 | Lingelem |
| 6,605,224 B2 * | 8/2003 | Aymong ............... 210/521 |
| 6,763,952 B2 * | 7/2004 | Hanks .................. 210/521 |
| 7,156,241 B2 * | 1/2007 | Hanks .................. 210/521 |

* cited by examiner

PRIOR ART

PRIOR ART

MULTISTAGE COMPOSITE FLUID SEPARATOR AND FILTER

CROSS REFERENCE TO RELATED APPLICATIONS

This application claims priority from U.S. Provisional Application Ser. No. 61/687,833 filed on May 2, 2012 which is incorporated by reference herein.

TECHNICAL FIELD

The present invention relates to a device used to separate composite fluids comprising at least two liquids of different specific gravities and/or for separating particulate matter from one or more fluids, and/or for removing liquid and solid contaminates from fuel.

BACKGROUND OF THE INVENTION

The present invention relates to a device used to separate composite fluids comprised of at least two liquids of differing specific gravities and to separate particulates from fluids.

Applicant's U.S. Pat. No. 6,763,952 hereby incorporated by reference describes and claims a composite fluid separator capable of isolating a first liquid from a composite fluid having a first and second liquid, in which the first and second liquids have differing specific gravities. An outer housing encloses a separation chamber. An inlet port delivers the composite fluid through an elongated spillway into the sump of the chamber. Positioned between the inlet port and the outlet port is a plurality of stacked baffles, composed of individual separation flow plates, placed in an inclined relationship. The plurality of baffles creates a flow path in which the composite fluid is forced to flow over each of the individual separation flow plates as it travels upward in the separation chamber toward the outlet port. More particularly the composite fluid separator, comprises, consists essentially of, and consists of a chamber with a top and bottom surface, a wall surrounding the periphery of said chamber; an inlet port in said top surface of said chamber, an outlet port on said wall of said housing; and a plurality of separation flow plates at an inclined relationship extending between said inlet port and said outlet port; wherein alternating separation flow plates of said plurality of separation flow plates have a first side and a second side, wherein said first side is positioned flush with a first chamber side wall and said second side is positioned by a predetermined distance from a second chamber side wall, and wherein the remaining separation flow plates of said plurality of separation flow plates have a first side and a second side, wherein said second side is positioned flush with said second chamber side wall and said first side is positioned said predetermined distance from said first chamber side wall, wherein said separation flow plates have an upper and a lower end, said lower end positioned a second predetermined distance from a chamber front wall.

Applicant's U.S. Pat. No. 7,156,241 hereby incorporated by reference provides an alternate method of separating a first liquid from a second liquid having a different specific gravity. A housing encloses a separation chamber. An inlet port delivers the composite fluid into the sump of the chamber. A plurality of stacked baffles is positioned between the inlet and outlet ports, composed of individual inclined separation flow plates. The baffles create a flow path in which the fluid flows over each of the plates as it travels upward in the separation chamber toward the outlet port. More particularly, the composite fluid separator comprises, consists essentially of or consists of a chamber with a top and bottom surface, a wall surrounding the periphery of said chamber; an inlet port in said top surface of said chamber; an outlet port on said chamber; a spiral plate, said spiral plate having an outer edge in sealing engagement with said wall of said chamber and said spiral plate formed in an upright funnel shape; and a center spillway, extending from said inlet port to said bottom surface of said chamber.

SUMMARY OF THE INVENTION

In accordance with the present invention, there is provided a composite fluid separator device for separating denser fluids and contaminating particles from a desired constituent fluid contained within an incoming composite fluid, said composite fluid separator including a containment vessel having an inlet and outlet traversing along the same axis and wherein fluid flow enters the inlet and flows from the bottom of the containment vessel toward the top of the vessel and out of the outlet. Also included is a first separator element being positioned at the bottom of the containment vessel. The first separator element comprises, consists essentially of or consists of a chamber containing a plurality of stacked plates forming baffles at an inclined relationship extending between the inlet port and a lower entrance to a second separator element, and wherein the baffles have an increasing angle of inclination relative to a vertical axis. The second composite separator element is positioned at a central location of the containment vessel just above the first separator element comprises, consists essentially of or consists of a chamber containing a plurality of stacked plates forming baffles at an inclined relationship extending from the a lower entrance of the second separator element to a lower entrance of a third separator element, and wherein the baffles have an increasing angle of inclination relative to a vertical axis. The upper ones of the plurality of separation flow plates have a plurality of layered subplates stacked thereon which are triangular in shape. The triangular subplates are configured so that fluid path facing edges create additional fluid paths for separating denser fluids and particulates from fluid flow through the baffles. The second separator element is capable of separating out finer contaminating particulates and fluids with densities nearer to the desired constituent fluid than the first separator element. The third composite separator element is positioned at a central location of the containment vessel just above the second separator element The third separator element comprises, consists essentially of, or consists of a chamber containing a plurality of stacked plates forming baffles at an inclined relationship extending from the lower entrance of the third separator element to the outlet port, and wherein the baffles have an increasing angle of inclination relative to a vertical axis. The upper ones of the plurality of separation flow plates have a plurality of layered subplates stacked thereon which are triangular in shape. The triangular subplates are configured so that fluid path facing edges create additional fluid paths for separating denser fluids and particulates from fluid flow through the baffles. The plates and subplates within the third separator element form baffles which are more narrow than those formed within the second separator element. The third separator element is capable of separating out finer contaminating particulates and fluids with densities nearer to the desired constituent fluid than the second separator element.

The composite fluid separator is capable of isolating a first liquid, being the desired constituent liquid, from a composite fluid having a first and second liquid, in which the first and second liquid have differing specific gravities. For example, the composite fluid separator provides a filter means for use in conjunction with large gasoline, kerosine, diesel and hydraulic engines. Additionally, the present invention can be used for the separation of particulate from fluids in any setting.

An inlet port, which enters into an inner chamber of the separation device, delivers the composite fluid through an elongated spillway, which delivers the fluid into the sump area of the chamber. The composite fluid separator is comprised of an inlet port and an outlet port, with a flow path therebetween. The flow path extends around a plurality of baffles. The plurality of baffles form planes which are stacked in an inclined, nonparallel relationship. The plurality of baffles are arranged so that a first side of alternating baffles are flush with the first side wall of the chamber, while the second opposing side of the baffles is placed a predefined distance from the second side wall of the inner chamber. The remaining alternating baffles in the stacked plurality are placed so that the second sides of the baffles are flush with the second side wall of the chamber and the first sides of the baffles are a predefined distance from the first side wall of the chamber. Such alternating positioning of the baffles within the chamber forms a serpentine flow path over the baffles and through the separation chamber.

The inclined, nonparallel position of the baffles creates numerous narrow flow channels between the baffles. The arrangement of the plurality of the baffles forces the composite fluid to be directed in a serpentine fashion across each baffle as that fluid moves through the numerous openings between the side walls of the chamber and the plurality of baffles toward the outlet port. The composite fluid follows this flow path and rises upwardly within the separation chamber. The serpentine pathway and the numerous baffles limit the upward mobility of the heavier liquid. The molecules of the heavier liquid come into contact with each other, coagulating into a larger mass, eventually dropping toward the bottom end of the inclined baffles along with the particulate into the sump area of the chamber.

The lower ends of the baffles extend toward, but not to, the front wall of the chamber. The spacing between the lower ends of the baffles and the front wall of the chamber is approximately one-half the size of the openings between the sides of the baffles and the chamber side walls.

Each of the baffles within the separation chamber is actually comprised of a series of subplates placed one on top of the other, which form a triangular stair step like structure. These subplates serve a directional purpose in that they direct the fluid upward towards the next baffle and also provide an irregular surface area which enlarges the contact surface area between the composite fluid and the baffles. The shearing of the composite fluid by the subplates assists with the removal of particulates and separation of fluids having differing specific gravities.

The composite fluid travels through the separation chamber and is sheared, thus efficiently and effectively isolating the liquids that form the composite fluid. After traveling through the flow path, the liquid with the lighter specific gravity reaches the outlet port of the chamber. The outlet port may also allow for use of other types of coalescing devices or filtering devices to be placed within the outlet port to further enhance the separation capabilities of the chamber.

Thus, one object of the present invention is to provide a separation chamber for composite fluids.

An additional object of the present invention is to provide a composite fluid separator which isolates a first fluid from a second fluid.

An even further object of the present invention is to provide a separation chamber for a composite fluid separator wherein the separation chamber has a plurality of baffles contained therein, the composite fluid passing over the plurality of baffles within the separation chamber.

Another object of the present invention is to have a separation chamber formed of a plurality of baffles wherein the baffles form a serpentine flow path for the composite fluid. The flow path may be increased by providing that each of the baffles is actually comprised of a plurality of baffles stacked upon each other in stair step fashion in order to force the composite fluid in an upward direction.

An additional object of the present invention is to provide a separation chamber wherein the flow path of the composite fluid is such that the fluid is quickly separated into distinct fluids based upon the specific gravity of the fluids, the baffles enabling the heavier fluids to be separated out and deposited into a sump area of the separation chamber.

Finally, another object of the present invention is to provide a composite fluid separation device wherein particulate material within the composite fluid may also be separated from the fluid.

All of the above-outlined objectives are to be understood as exemplary only and many more objectives of the invention may be gleaned from the disclosure herein. Therefore, no limiting interpretation of the objectives noted is to be understood without further reading of the entire specification, claims and drawings included herewith.

DETAILED DESCRIPTION OF THE EMBODIMENT

Figure 1:
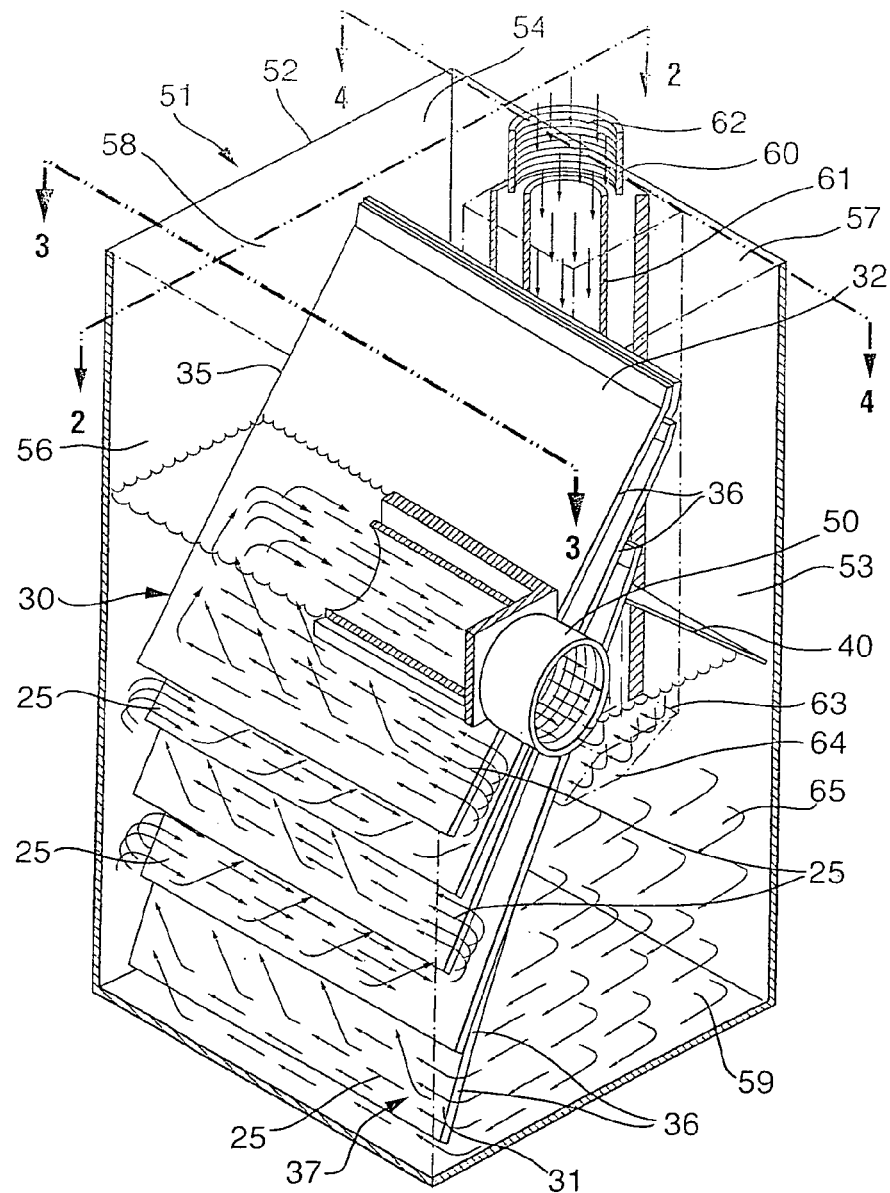
FIG. 1 is a perspective partial cut-away of an embodiment of a composite fluid separator illustrating the flow path of the composite fluid.

FIG. 1 is a cut-away perspective view of the composite fluid separator 51 used to separate a composite fluid having two fluids with differing specific gravities and also used to remove particulate from fluids. An outer housing 52 encloses an inner separation chamber 53. Although the shape of the separation chamber 53 may vary, one embodiment is square. However, many varying geometries may be utilized in order to accomplish the separation of composite fluid using the principals of the present invention and no limiting interpretation should be read into the exemplary specific devices described herein.

The separation chamber 53 has a top and bottom surface 54, 55, a front and rear wall 56, 57, and a first and second side wall 58, 59. The periphery of the separation chamber 53 is surrounded by walls. An inlet port 60 penetrates the top surface 54 of the chamber 53 and extends to form an elongated spillway 61 that is attached to the rear wall of the chamber 53. The inlet port 60 has a first and second end 62, 63. The first end 62 of the inlet port 60 is near the top surface 54 of the inner chamber 53 and is open. The inlet port 60 and the spillway 61 can be integrated into a singular spillway component or the inlet port 60 and the spillway 61 can be separate elements which possibly telescope together.

The second end 63 of the spillway 61 extends down toward the bottom wall or surface 55 of the separation chamber 53 along rear wall 57. The lower or second end 63 of the spillway 61 is open, but does have an end baffle 64 attached at an angle in order to dispense the material at an angular path.

As the composite fluid flows out of the lower end 63 of the spillway 61 into the sump portion 65 of the chamber 53, the end baffle 64 serves to provide a shearing mechanism for the composite fluid which is then deposited through the spillway into the chamber. This initial shearing by the end baffle 64 allows the heaviest droplets of liquid to fall out of the composite fluid and remain in the sump portion 65 of the chamber 53.

The end baffle 64 of the spillway 61 serves to direct the composite fluid to a portion of the sump 65 of the chamber 53 furthest away from the flow path created by the plurality of baffles 30. This forces the composite fluid to travel across the sump 65 of the chamber 53 to the plurality of baffles 30. This travel of the fluid allows the larger droplets of the heavier liquid of the composite fluid to fall out of the fluid and remain in the sump 65 of the chamber 53.

Figure 2:
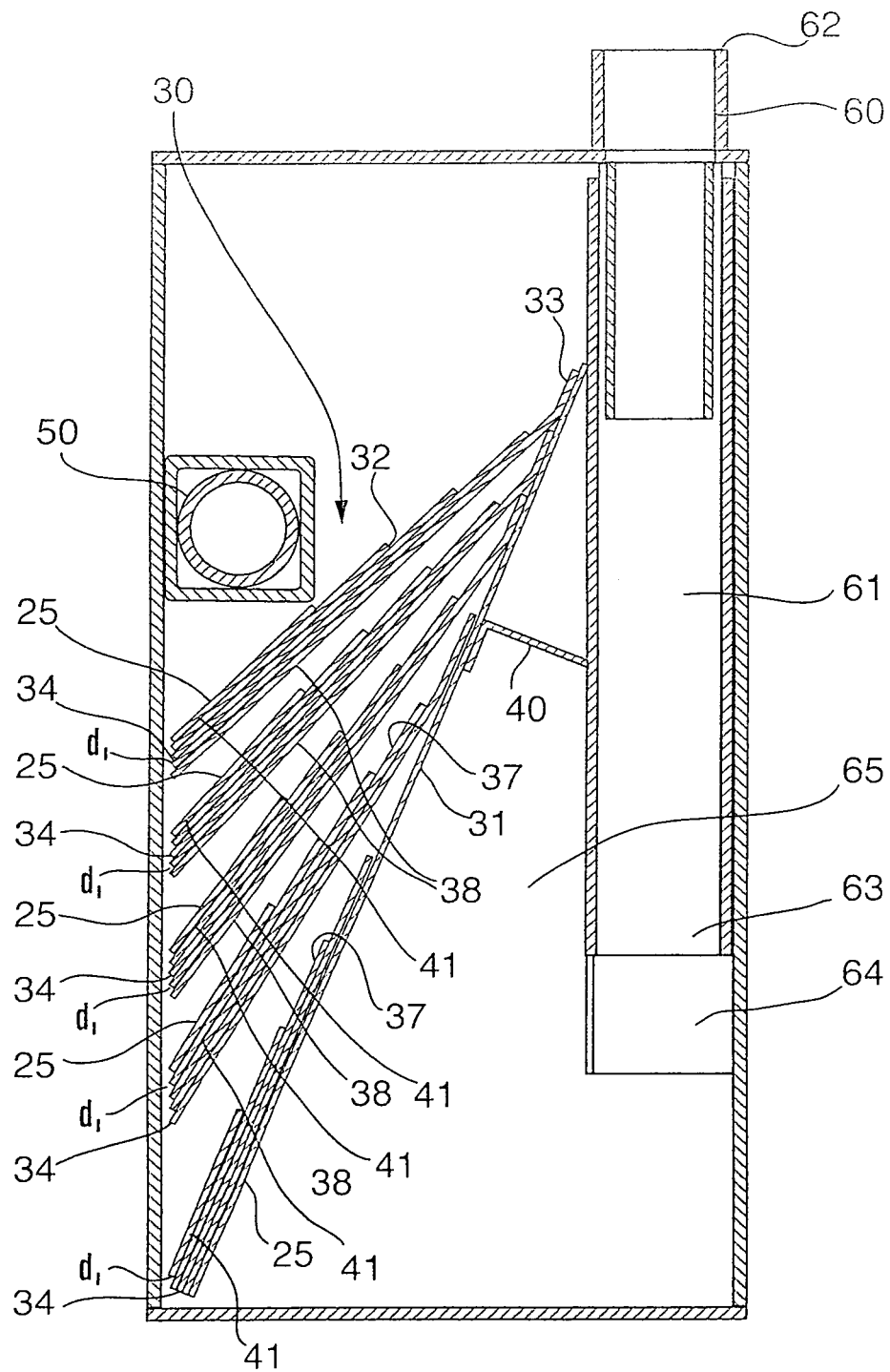
FIG. 2 is a sectional side view of an embodiment of the composite fluid separator taken along the lines 2-2 in FIG. 1, depicting the interior of the present invention in a plane.

Layered within the separation chamber 53 is a plurality of baffles or plates 30 stacked in an inclined, nonparallel relationship. As is shown in FIG. 2, this plurality of baffles 30 has a base or rear-most baffle or plate 31 which is connected to the spillway 61 at an upper end 33 thereof thereby forming the sump area 65 within the chamber 53. The upper ends of each of the remaining plurality of baffles 30 are attached to the base baffle 31 at an inclined angle. These remaining plurality of baffles 30 are positioned at an inclined relationship to the base baffle 31 at an angle increasing in relation to the vertical axis of the chamber 53.

All of the plurality of baffles 30 extend across the chamber 53 from the upper end at a downward angle directed toward the front wall 56 of the chamber 53. Each of the plurality of baffles 30 is sized to cover most of the entire width of the inner chamber 53 from side wall 59 to side wall 58. The lower ends 34 of the plurality of baffles 30 do not come into contact with the front wall 56 of the chamber 53, but rather end at a predetermined distance d1 from the front wall 56 of the chamber 53. The predetermined distance d1 may vary depending upon the circumstances and the environment in which the filter is being used and the material being separated.

Figure 3:
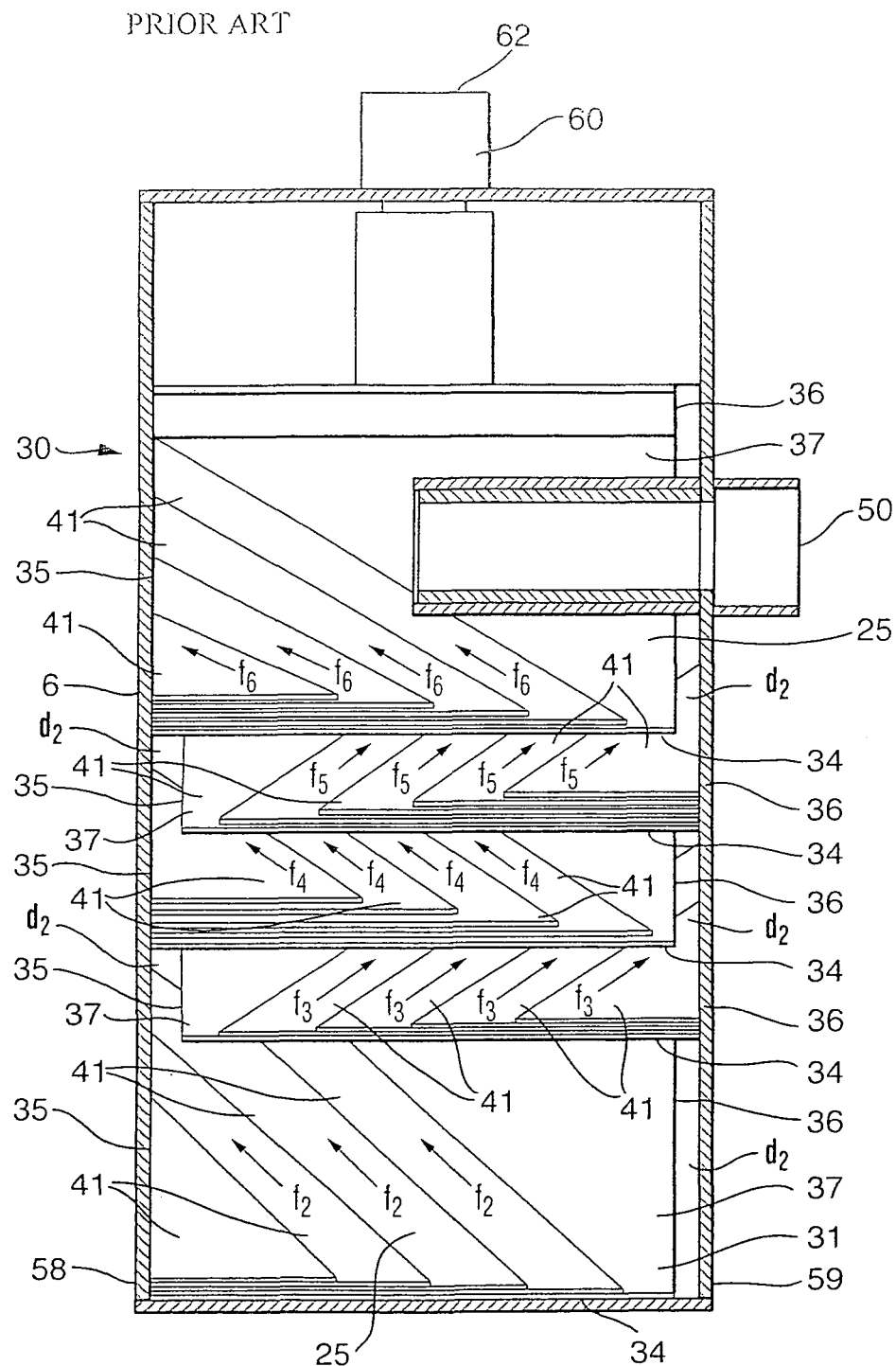
FIG. 3 is a side sectional view of an embodiment of the composite fluid separator taken along the lines 3-3 in FIG. 1, depicting the plurality of baffles stacked in an inclined relationship in a plane.
Figure 4:
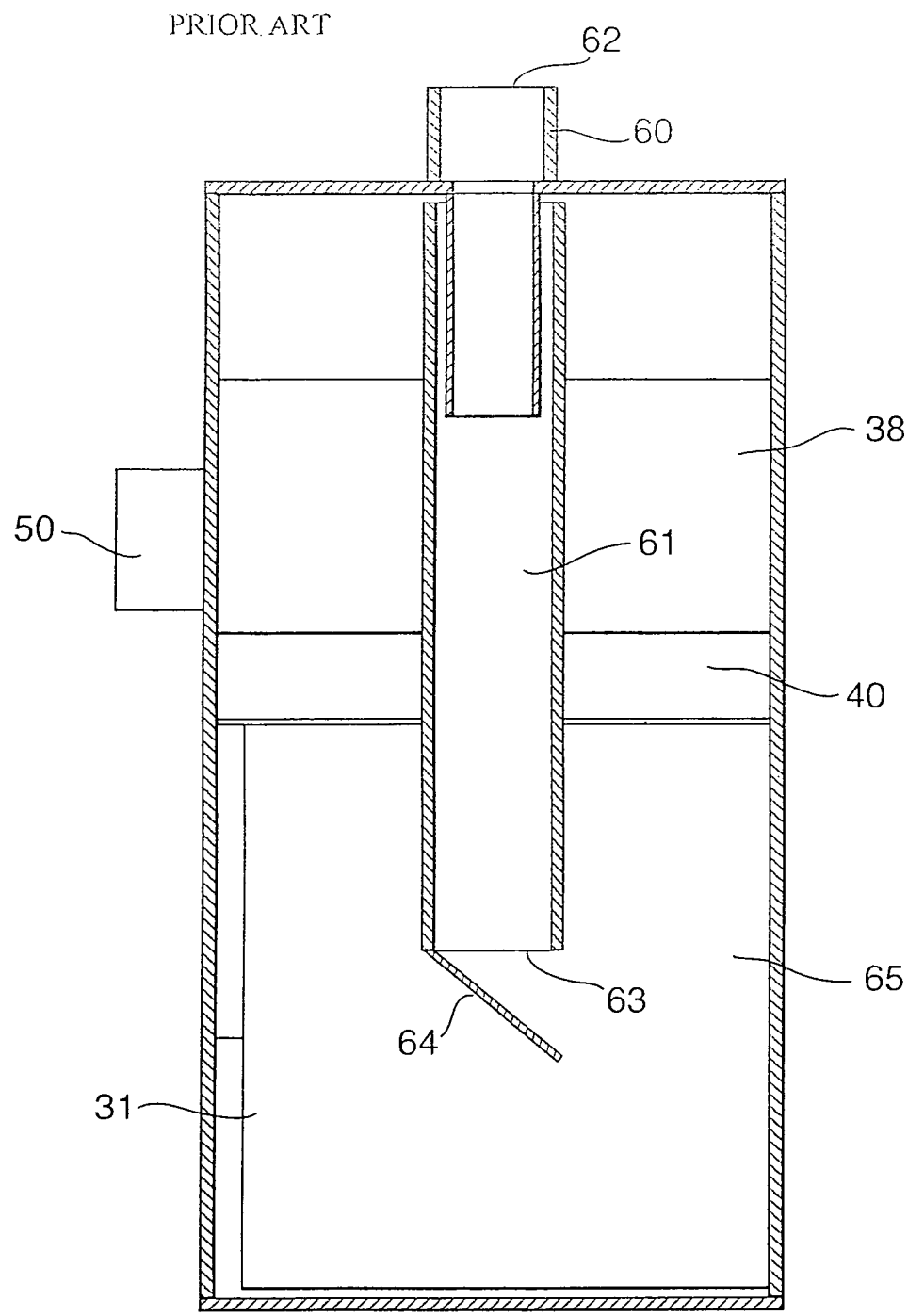
FIG. 4 is a sectional side view of an embodiment of the composite fluid separator taken along the lines 4-4 in FIG. 1, depicting the interior of the present invention in a plane.

The inclined relationship of the plurality of stacked baffles 30 creates a flow path f1, as is shown in FIG. 1, between the inlet port 60 and outlet port 50. FIG. 3 depicts the placement of the plurality of the baffles 30 in relation to the side walls 58, 59 of the chamber 53. The plurality of baffles, disclosed in FIG. 1, is comprised of individual fluid separation plates or separation flow plates 25. The separation flow plates 25 provide the surface area over which the flow path f1 passes. In a first plurality of baffles, a first side 35 of each separation flow plate is flush with the first side wall 58 of the chamber 53, while the opposing second side 36 of the separation flow plate or baffle 25 of said plurality of baffles 30 is placed a predetermined distance d2 from the second side wall 59 of the inner chamber 53. The remaining alternating flow plates or baffles 25 in the stacked plurality of baffles 30 are placed so that the second side 36 of the baffles is flush with the second side wall 59 of the chamber 53, and the first side 35 of the baffles is placed a predetermined distance d2 from the first side wall 58 of the chamber 53. The positioning of the separation flow plates in an alternating spaced relationship with the first side wall 58 and a second side wall 59 of the separation chamber 53 creates a flow path f1 through which the composite fluid flows. The fluid separation plates 25 are placed in a stacked fashion in which they extend upwardly and rearwardly from a front wall 56 of the separation chamber 53 to a base baffle 31.

The number of separation flow plates comprising the plurality of baffles 30 in the displayed embodiment is five. However, depending on the efficiency of separation required, the actual number of baffles may vary. The more baffles placed within the separation chamber 53, the more efficient the separation process and longer the flow path f1. In situations where the flow of the composite fluid is not a concern, the number of surface area flow plates 25 created by the plurality of baffles 30 could be substantially increased. Additionally, multiple sets of plurality of baffles 30 could be placed in succession within a larger chamber to provide even additional separation capability.

The separation flow plates 25 creating the plurality of baffles 30 by which flow path f1 passes are formed by the top surfaces 37 of each of said separation flow plates 25 for each one of said plurality of baffles 30. The flow path f1 for each separation flow plate 25 extends across the separation flow plate 25 in an area bounded by the flow plate 25 and the bottom surface 38 of an upper adjacent baffle of said plurality of baffles 30 and the front wall 56 of the inner chamber 53.

Each of said plurality of baffles 30 within said separation chamber are defined by the separation flow plates 25, the separation flow plates 25 being the individual baffle and hence the surface area which the composite fluid passes over. In the embodiment shown in FIG. 1, each of the flow plates 25 is comprised of a single flat top surface 37, wherein the flow path f1 moves over the smooth surface thereof As can be seen from FIGS. 2 and 3, the separation flow plates 25 may also be comprised of triangular subplates 41 which form sub-flow paths f2, f3, f4, f5 and f6. As can be seen, these multiple flow paths forming composite fluid flow path f1 increase the surface area upon which the material must pass and therefore properly separates the fluid appropriately.

Each of the separation flow plates 25 from the base plate 31 to the top plate 32 in the plurality of baffles 30 is placed at an angle that increases in relation to a vertical axis of the separation chamber housing 52 as the separation flow plates 25 approach an outlet chamber 50. In the disclosed embodiment, the vertical separation between each individual baffle or the separation flow plate 25 and the next upper individual baffle decreases throughout the flow path. The continuing decrease in the vertical separation between individual baffles and corresponding increase of the angle of the individual baffles affects the ability to separate composite fluids and various sized particulate by affecting the velocity that the fluid travels and the amount of turbulence that the composite fluid experiences. As the angle of the separation flow plate 25 forming the plurality of baffles 30 increases relative to the vertical axis, the speed of the fluid in flow paths f2, f3, f4 and f5 increases. The angle of the plates become progressively closer or tighter thereby increasing the filtration ability to capture finer and finer contaminants of each plate. The plurality of baffles 30 may be composed of steel, stainless steel, aluminum, a plastic composite or any other similar material.

A support brace 40 for the plurality of baffles 30 extends from the rear wall 57 of the chamber 53 to the bottom surface 38 of the base baffle 31. This support brace 40 is sized to extend in the chamber 53 from the rear wall 57 to the bottom surface of base baffle 31. Not only does the support brace 40 serve to assist in supporting the plurality of baffles 30, the support brace also separates the separation chamber 53 into a sump area 65 and an outlet port 50, by serving as an isolation wall to prevent the composite fluid from reaching the outlet port 50 without traveling the flow path f1 created by the plurality of baffles 30. While in the preferred embodiment the support brace 40 extends from the rear wall 57, the support brace 40 can attach to either of the chamber side walls 58, 59.

Figure 5:
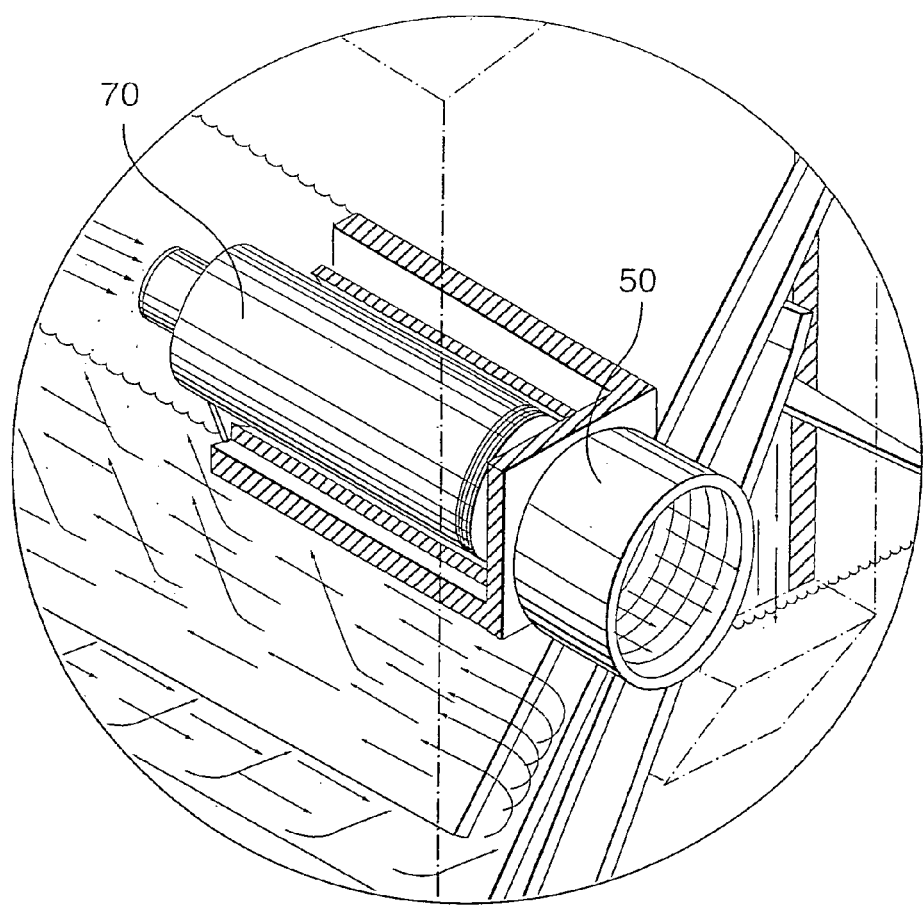
FIG. 5 is a sectional view of the output port of the composite fluid separator with a filtration device encompassed within the outlet port.

The outlet port 50 is capable of receiving supplemental filtering or coalescing devices 70 that serve to further enhance the separation capacity of the composite fluid separator, as is shown in FIG. 5. Additionally, the outlet port 50 could incorporate a magnetic fluid conditioner to separate the composite fluid.

In other embodiments of the present invention, the distances d2 between the first and second sides 35, 36 of the baffles and the side walls 58, 59 of the chamber 53 and distance d1 the lower end 34 of the baffles and the front wall 56 of the chamber 53 may vary depending upon the circumstances and environment in which the composite fluid separator 51 is being utilized. However, the distances d1 between the lower ends 34 of the plurality of baffles 30 and the front chamber wall 56 must be less than the distance d2 between the first side 35 and second side 36 of the plurality of baffles 30 and the chamber side walls 58, 59. This is necessary to ensure that the fluid moves through the flow path f1, as well as f2, f3, f4, f5 and f6, across each of the separation flow plates 25. As fluid will flow through the path of least resistance, it is important that the opening between the first side and second side 35, 36 of the separation flow plates 25 and the chamber walls 58, 59 provide this path of least resistance.

It is not the distance between the plates in a group but the angle of the plates in a group in relationship to each other and to other groups of plates which determines the degree of separation of the fluids exposed thereto. There can be a group of plates with varying angles, whereby some or all may or may not be wider apart at one end of a plates in relationship to the next late in system line or other plates in the group.

For instance, a first group may have a plurality of plates that start out at an angle of 21.00789 degrees whereby fluid flows over and around other plates with the last group having an angle of 8.0056 degrees. As the fluid flows not only over but around and through the plates (where they are connected or compressed) this causes the heavier contaminants to move slower than the lighter fuel and to coalesce or drop out and be captured by a group of plates which concentrate that density of fluid.

A second group of plates may start out angled 14.10039 degrees then progress through the plurality of plates in the group down to a plate having an angle of 4.099 degrees. Again this causes the fluid to slow as it flows through, over, and around the plates to slow allowing much of the remaining contaminates to fall out be captured by the group of plates.

The degree of separation of the fluids will vary with the size and number of individual plates, the number of plate groups and the angles of the plates. In general, the tighter angles means that more and finer contaminants can be removed from the fluid being treated.

The inclined, nonparallel positioning of the separation flow plates 25 creates numerous flow paths between the plurality of baffles 30. This flow pathway is the only route through which the composite fluid may flow before accessing the outlet port 50. As the composite fluid follows this flow path created by the plurality of separation flow plates 25, the fluid rises upward in the chamber 53 in a serpentine fashion through the plurality of flow paths mentioned. The flow paths created by the plurality of baffles 30 and hence the individual separation flow plates 25 limit the upward mobility of the fluid with the heavier specific gravity. The molecules of the fluid with the heavier specific gravity come into contact with each other and coagulate into a larger mass until eventually this mass drops into the sump portion 65 of the chamber 53. The fluid rises in the chamber 53 and continues to lose the heavier fluid and thus the speed with which the fluid travels increases.

In an alternative embodiment of the present invention, as is shown in FIG. 2, each of the separation flow plates 25 may be comprised of a series of subplates 41. In the alternative embodiment, these subplates 41 are a variety of sizes and may be triangular in shape. The subplates 41 are stacked to form a stair-like structure and therefore form the flow paths f2-f5 noted.

The triangular shape of the subplates 41 serves to further direct the composite fluid at an angle up toward the next separation chamber. The series of subplates 41 also provide each of the separation flow plates 25 with an irregular surface and enlarge the contact surface area between the composite fluid and the separation flow plates 25. Increasing the contact surface area with the series of subplates 41 increases the separation of the composite fluid, and the series of subplates 41 also provide a plurality of flow paths across each of the fluid separation plates 25.

Although the preferred embodiment of this invention utilizes subplates 41 in the shape of triangles, the shape of these subplates 41 may vary to include other shapes such as square, rectangle or another shape. The separation flow plates 25 and subplates 41 may also be coated with a reduced friction coating such as TEFLON or other similar type of material to reduce adherence and aid in release of the particulates from the surface of the plates.

Figure 6:
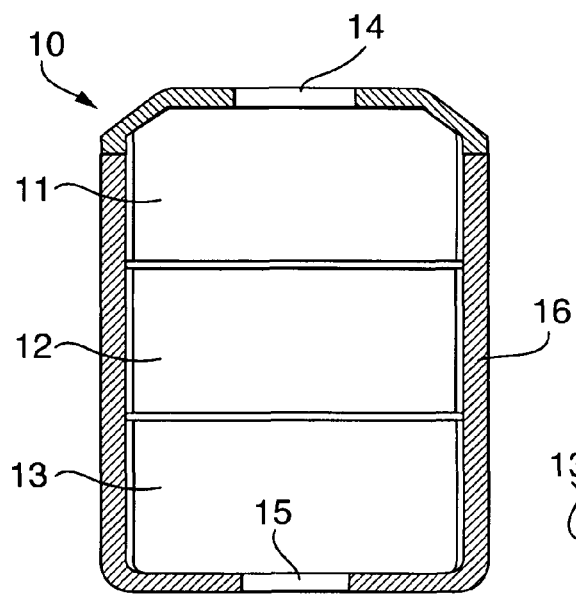
FIG. 6 is a sectional view of a multistage composite fluid separator and filter device incorporating a plurality of stages into a single unit.
Figure 7:
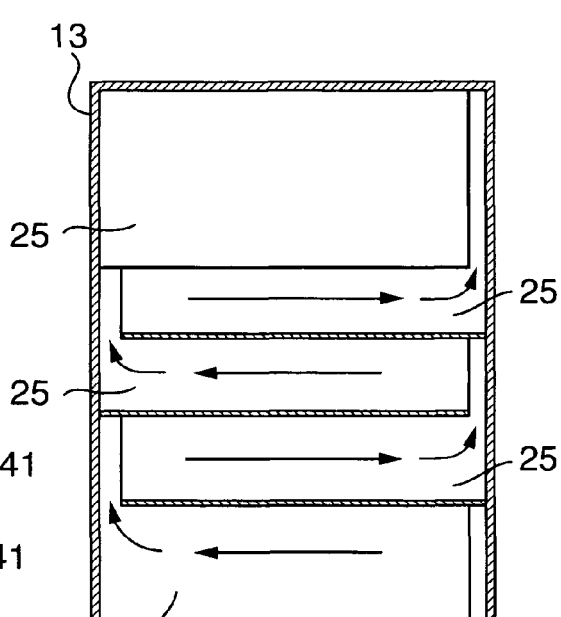
FIG. 7 is a sectional view of the first stage of the multistage fluid separator and filter device of FIG. 6.

The preferred embodiment of the present invention is the multistage fluid separator 10 in FIG. 6 which includes an exterior shell or containment vessel 16 with an inlet 15, an outlet 14, and separator elements 11, 12 and 13. The direction of fluid flow is essentially from bottom to top. The first stage separator element 13 is shown in FIG. 7 and includes five separation flow plates 25 which function to create flow paths which cause denser fluids to drop toward the bottom of the separator while allowing less dense fluids to continue upward. These flow plates 25 form or configure multiple layers of fluid coalescing/separating baffles which separate the desired liquid or gases from unwanted/or removable products, thus causing the desired liquid or gas to proceed upward toward the outlet 14, while causing the unwanted denser liquids or gases and particulates to settle downward to the bottom of the separator 20. Baffles create a flow path over each of the plates as the fluid travels toward the separation chambers. Plate and baffle size, number of plates and baffles, material makeup and composition will vary within this element. Other embodiments may have fewer or more flow plates 25. Particular coatings on the plates may be used to enhance separation. It is anticipated that more than 5 separation flow plates may be used, as desired.

Figure 8:
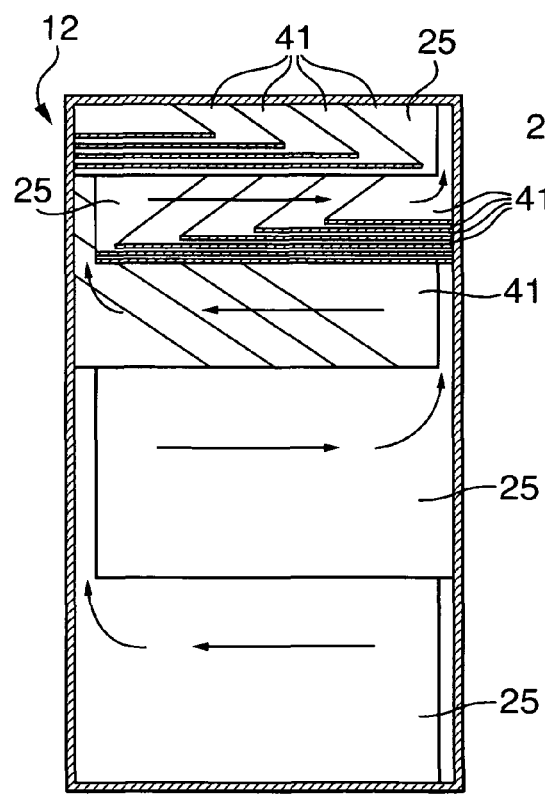
FIG. 8 is a sectional view of the second stage of the multistage fluid separator and filter device of FIG. 6.

The second stage separator element 12 shown in FIG. 8 includes five separation flow plates 25 wherein each of the top three plates 25 has four subplates 41 of decreasing size stacked thereon. As discussed with reference to FIG. 3, the edges of the triangular shaped subplates encourage flow paths to further separate denser fluids from the less dense fluids and to cause particulates to drop out. The plates 25 and subplates 41 create a more restrictive flow path than the separator element 13. This allows for finer/lighter materials to be separated. Different embodiments contain plates and subplates with varying sizes, number of each and material make up or composition.

Figure 9:
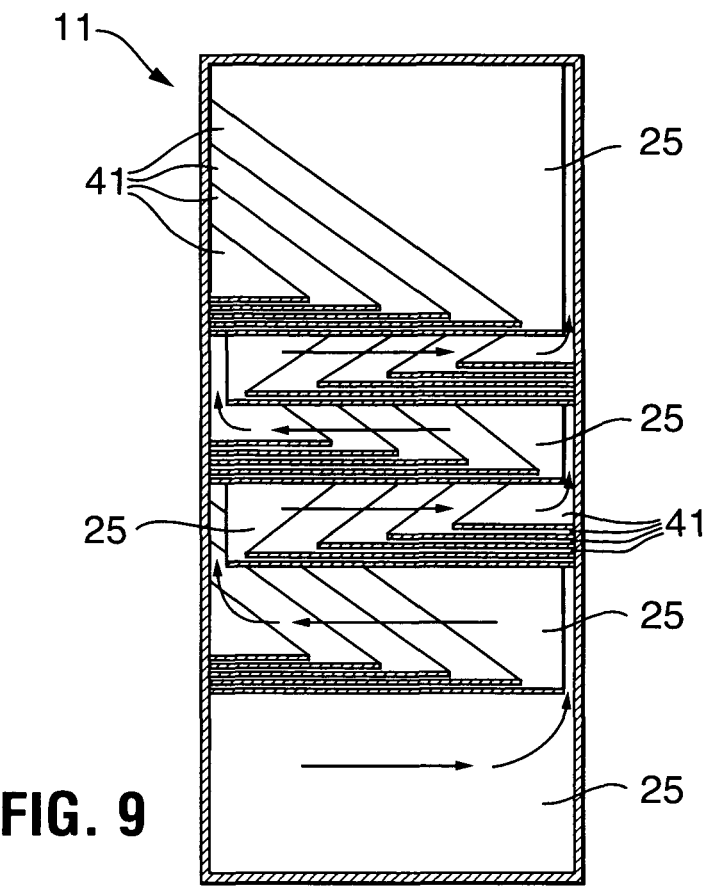
FIG. 9 is a sectional view of the third stage of a multistage fluid separator and filter device of FIG. 6.

The third stage separator element 11 shown in FIG. 9 has seven separation flow plates 25 wherein each of the top five plates 25 has four subplates 41 of decreasing size stacked thereon. As discussed with reference to FIG. 3 and in the paragraph above, the edges of the triangular shaped subplates encourage flow paths to further separate denser fluids from the less dense fluids and to cause further particulates to drop out. Third stage separator element 11 provides finer filtering of the fluid than that which is provided by the second stage element 12. As above, different embodiments contain plates and subplates with varying sizes, number of each and material make up or composition In fluids containing components of different densities such as fuel oils, the first stage separator element 13 filters out the densest fluids and largest particulates. The second stage element 12 separates the denser fluids from the lighter density fluids, for example, light or heavy oil fluids such as different grades of diesel fuel or fuel oil containing contaminants whereby the lighter density fuel is the desired product fuel in the fluid to be separated. The third stage element 11 filters out fluids not caught in the first two elements. The multistage fluid separator combines a plurality of separator elements to provide enhanced filtering performance. Element 13 removes and holds water, heavy oils and particulates. As the fluid passes through the first stage, water droplets collide and form larger droplets. These heavy droplets then fall out of the fluid flow and are trapped at the bottom. Heavier particulates also fall out. Element 12 has spacing before and after so medium sized particulates and droplets can collide to form larger heavier droplets. While this material is lighter than what is collected in element 13, the lighter materials are held in this stage or will drift down to element 13. Particulates from element 12 drop down to element as well. In element 11, the small particulates, water droplets and heavy oils tend to collide with each other more. Therefore, the walls of the separator and plates cause larger droplets to form, encapsulating particulate and heavy oil aerosol droplets down to a small size of 10 microns.

The fluid separator 10 works well with either liquid or gaseous materials. While fluid separator 10 contains three elements, there is no limit to the number of composite separator elements that can be used. The separator element has no restriction on materials composition. Flow plates and subplates may be coated with Teflon or any other applicable coating which enhances the separation and filtering function. Different embodiments contain plates and subplates with varying sizes, number of each and material make up or composition. Moreover, instead of one plate per segment of the total filtration system, there may be thousands of the same size plates inter-connected per segment wherein the fluid to be treated and separated is flows not only over but through and around the interconnected plates of each segment. Multilayered segments provides numerous new and different "channels" for the flow of the fluids.

Figure 10:
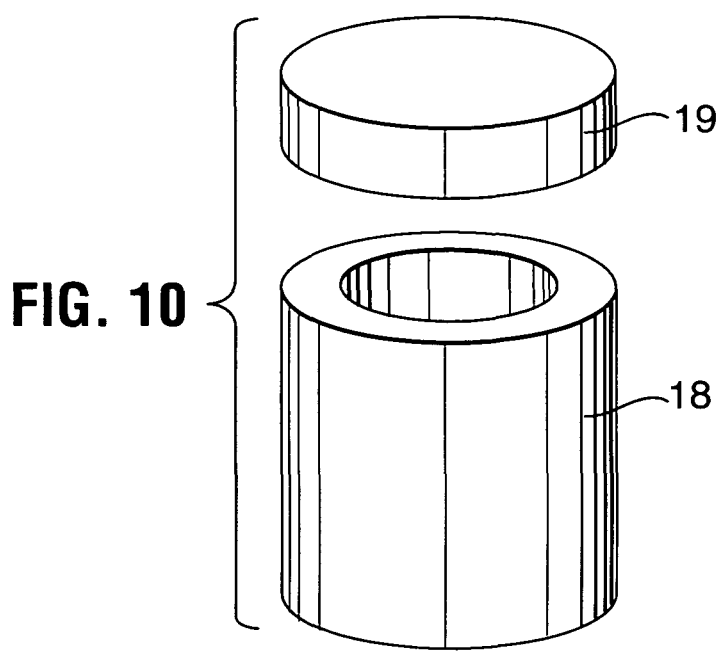
FIG. 10 shows a perspective end view of a coalescing filter and a filter end cap for use with the multistage fluid separator and filter device.
Figure 11:
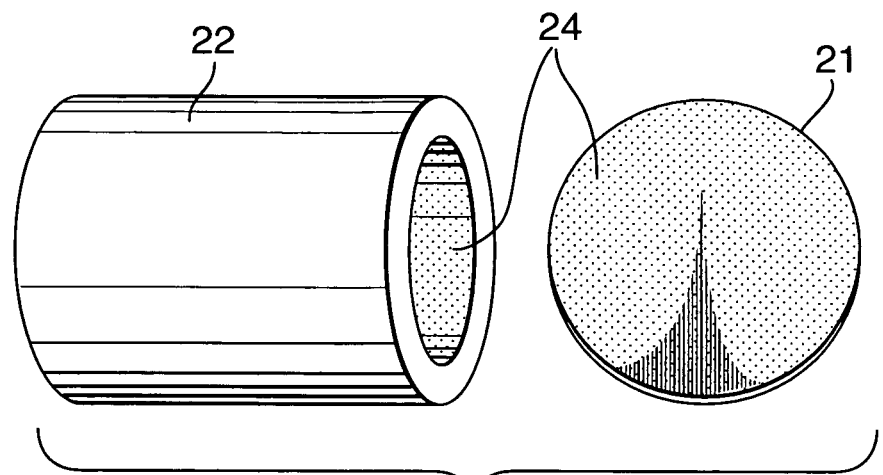
FIG. 11 is a side view of coalescing filter and end cap with an interior coating for use with the multistage fluid separator and filter device.
Figure 12:
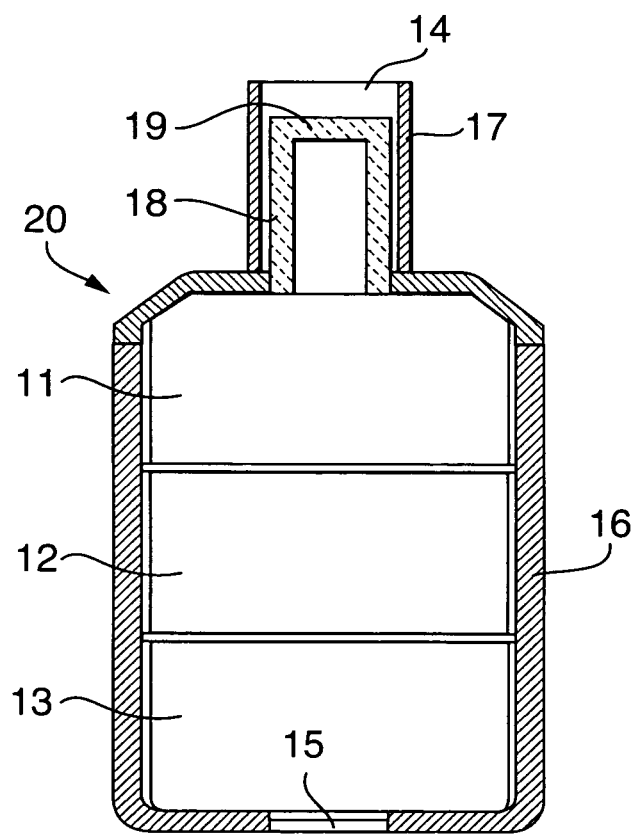
FIG. 12 is a sectional view of a multistage filter with a coalescing filter included at the outlet for use with the multistage fluid separator and filter device.

Another preferred embodiment of the multistage filter 20, shown in FIG. 12 includes a cylindrical ceramic seperator 18 located in the outlet tube 17. The ceramic separator 18 shown in FIG. 10 can be configured to separate materials down to 1800 ppm (parts per million), 1200 ppm, 800 ppm, 400 ppm or less. Coatings such as coating 24 shown in FIG. 11 allow for separation of materials down to 4 ppm or less.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

I claim:

1. A multistage composite fluid separator device for separating denser fluids and contaminating particles from a desired constituent fluid contained within an incoming composite fluid, said composite fluid separator comprising;

a containment vessel having an inlet and outlet traversing along the same axis and wherein fluid flow enters said inlet and flows from the bottom of said containment vessel toward the top of said vessel and out of said outlet;

a first separator element being positioned at the bottom of said containment vessel said first separator element being comprised of a chamber containing a plurality of stacked plates forming baffles at an inclined relationship extending between said inlet port and a lower entrance to a second separator element, and wherein said baffles have an increasing angle of inclination relative to a vertical axis as the baffles approach said outlet port;

said second composite separator element being positioned at a central location of said containment vessel just above said first separator element, said second separator element being comprised of a chamber containing a plurality of stacked plates forming baffles at an inclined relationship extending from said lower entrance of said second separator element to a lower entrance of a third separator element, and wherein said baffles have an increasing angle of inclination relative to a vertical axis as the baffles approach said outlet port, the upper ones of said plurality of separation flow plates having a plurality of layered subplates stacked thereon, and wherein said plurality of layered subplates are triangular in shape, said triangular subplates being configured so that fluid path facing edges create additional fluid paths for separating denser fluids and particulates from fluid flow through said baffles, said second separator element being capable of separating out finer contaminating particulates and fluids with densities nearer to said desired constituent fluid than said first separator element; and said third composite separator element being positioned at a central location of said containment vessel just above said second separator element, said third separator element being comprised of a chamber containing a plurality of stacked plates forming baffles at an inclined relationship extending from said lower entrance of said third separator element to said outlet port, and wherein said baffles have an increasing angle of inclination relative to a vertical axis as the baffles approach-said outlet port, the upper ones of said plurality of separation flow plates having a plurality of layered subplates stacked thereon, and wherein said plurality of layered subplates are triangular in shape, said triangular subplates being configured so that fluid path facing edges create additional fluid paths for separating denser fluids and particulates from fluid flow through said baffles, said plates and subplates within said third separator element forming baffles which are more narrow than those formed within said second separator element, said third separator element being capable of separating out finer contaminating particulates and fluids with densities nearer to said desired constituent fluid than said second separator element.

2. The multistage composite fluid separator device of claim 1 wherein said plurality of baffles is positioned so that each alternating baffle has a first side and a second side, said first side being flush with a first chamber side wall and said second side of said alternating baffles being positioned from a second chamber side wall a first predetermined distance, the remaining of said plurality of baffles have said second side flush with said second chamber side wall and said first side of said plurality of baffles positioned said first predetermined distance from said chamber first chamber side wall.

3. The multistage composite fluid separator device of claim 2 wherein each of said plurality of fluid separation plates is separated from a front wall o f said separation chamber by a second predetermined distance, said second predetermined distance being less than said first predetermined distance.

4. The multistage composite fluid separator device of claim 1 wherein said flow plates and said subplates are coated with a substance which enhances separation of liquids and particulates from said desired fluid constituent fluid.

5. The multistage composite fluid separator device device of claim 1 further including a ceramic separator connected at said outlet port.

6. The multistage composite fluid separator device device of claim 5 wherein said ceramic separator includes a coating which further enhances separation of liquids and particulates from said desired fluid constituent fluid.

* * * * *